(No Model.) 4 Sheets—Sheet 1.
W. H. THURMOND.
CAR COUPLING.
No. 350,785. Patented Oct. 12, 1886.
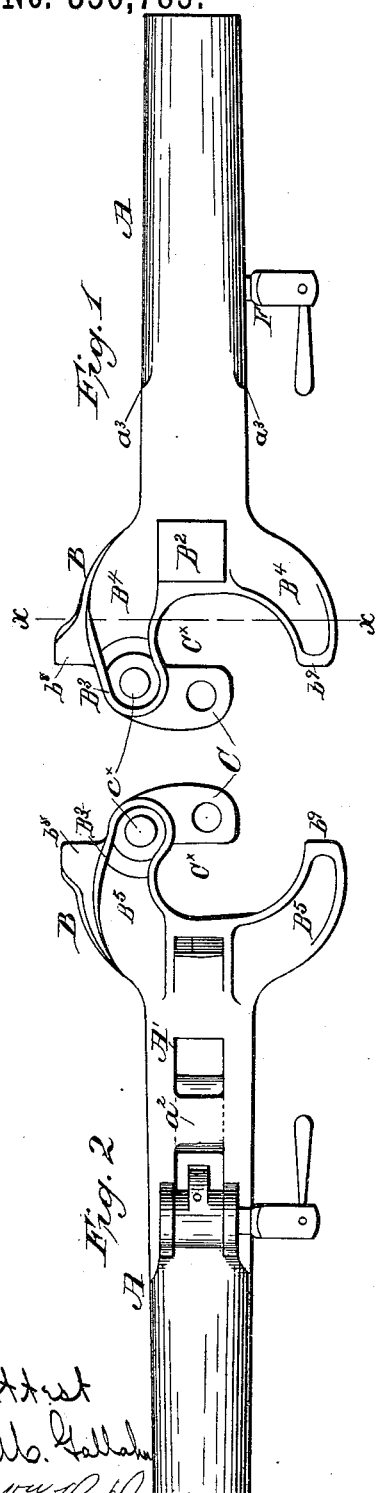
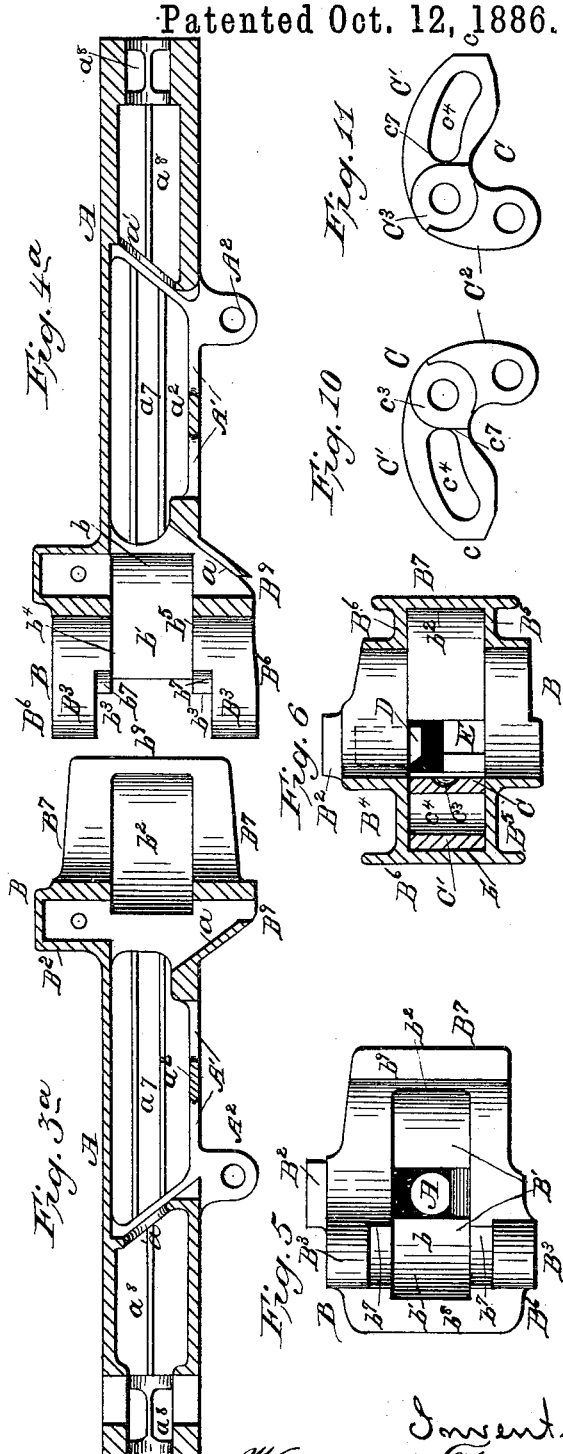
Attest
C. M. Gallaher
Wm. R. Davis
Inventor
William H. Thurmond
Henry Orth
per
Atty

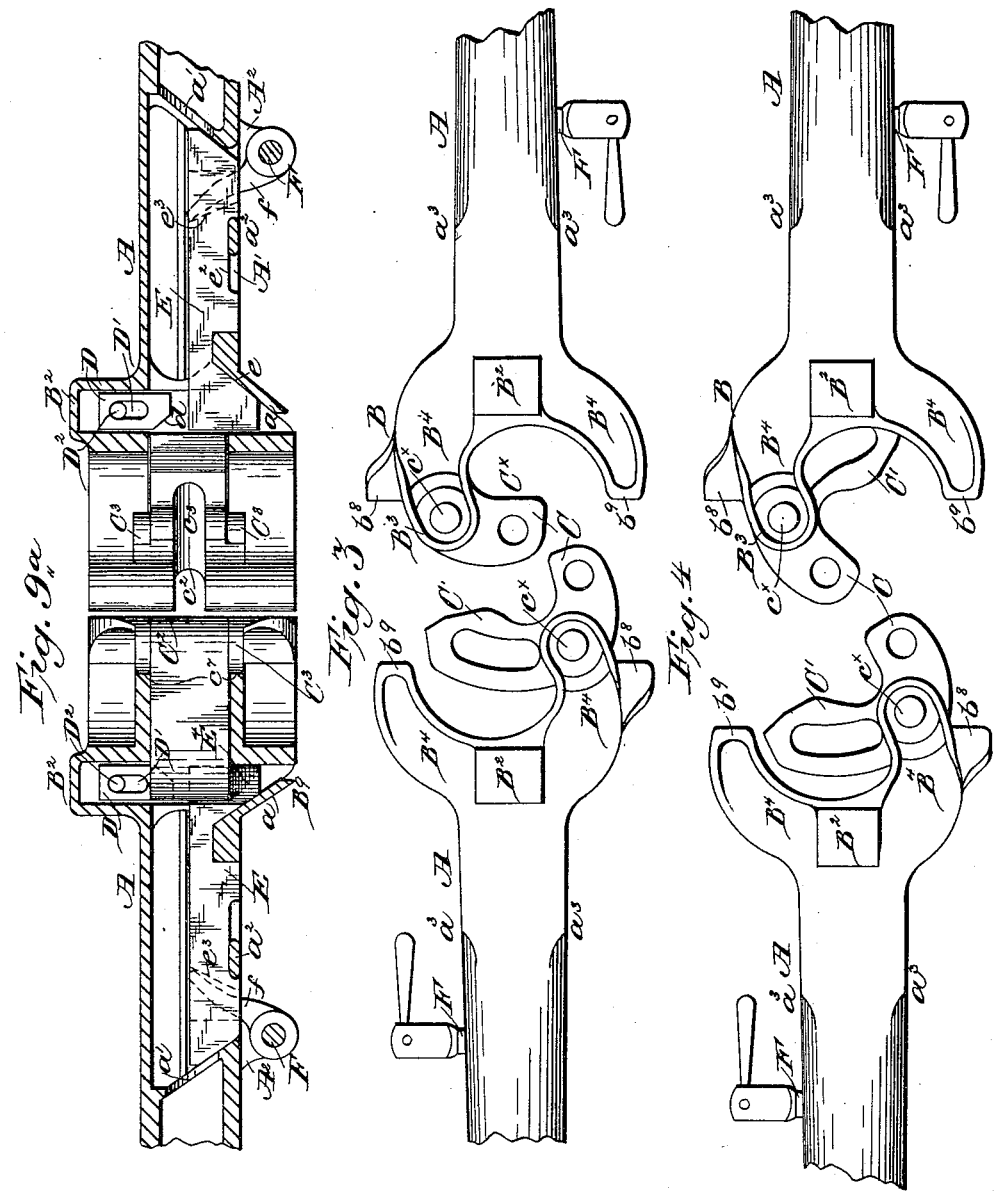

(No Model.) 4 Sheets—Sheet 3.
W. H. THURMOND.
CAR COUPLING.
No. 350,785. Patented Oct. 12, 1886.
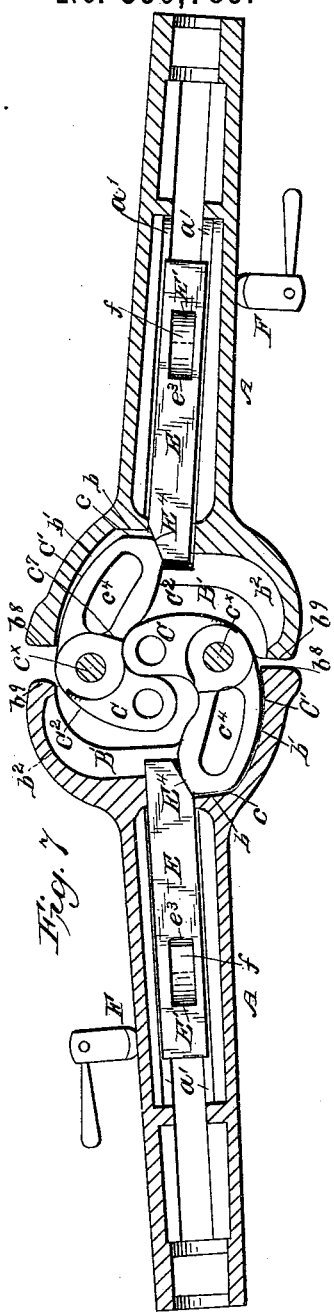
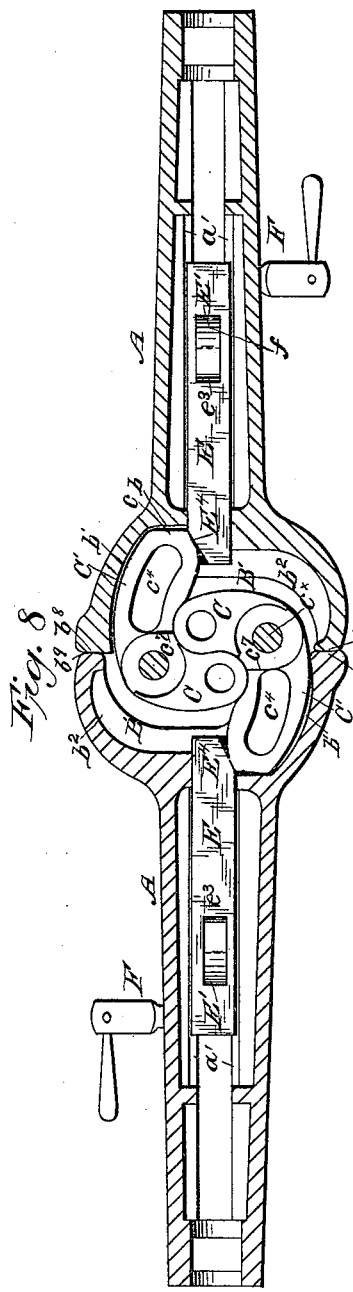
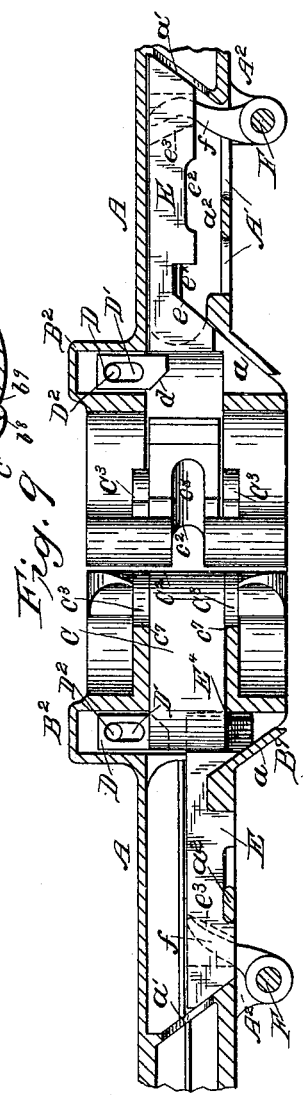

(No Model.) 4 Sheets—Sheet 4.
W. H. THURMOND.
CAR COUPLING.
No. 350,785. Patented Oct. 12, 1886.
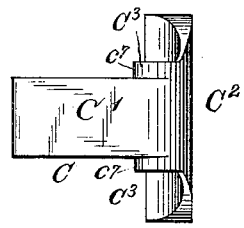
Fig. 12
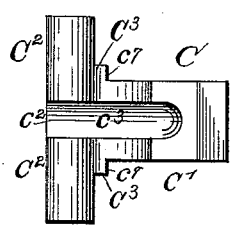
Fig. 13
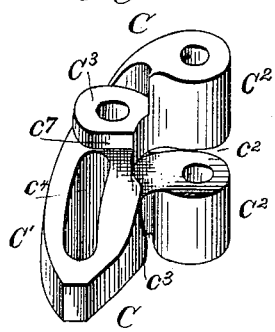
Fig. 14
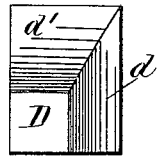
Fig. 17.ª
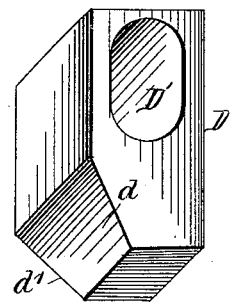
Fig. 17.
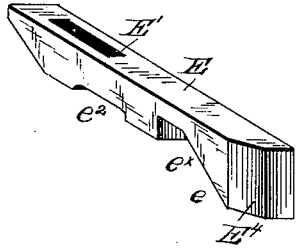
Fig. 15
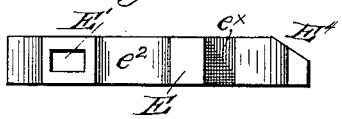
Fig. 16
Attest
C. M. Gallaher
Wm. R. Davis.
Inventor
William H. Thurmond
Henry Orth
Atty

UNITED STATES PATENT OFFICE.

WILLIAM H. THURMOND, OF FORSYTH, GEORGIA, ASSIGNOR TO THE THURMOND CAR COUPLING COMPANY.

CAR-COUPLING.

SPECIFICATION forming part of Letters Patent No. 350,785, dated October 12, 1886.

Application filed July 28, 1886. Serial No. 209,315. (No model.)

*To all whom it may concern:*

Be it known that I, WILLIAM H. THURMOND, a citizen of the United States, residing at Forsyth, in the county of Monroe and State of Georgia, have invented certain new and useful Improvements in Car-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Referring to the accompanying drawings, Figures 1 and 2 are a top and bottom plan view, respectively, of the coupler. Fig. 3 is a like view of two couplers in the act of approaching each other for coupling, the hook of the coupler on the right being shown as locked in the draw-head by the thrust-bar, and that on the left as swung out of the draw-head. Fig. 4 is also a top plan view showing two couplers in the act of approaching each other for coupling, in which both the hooks are shown as swung out of the draw-head. Figs. 3$^a$ and 4$^a$ are vertical longitudinal axial sections showing the two halves of the draw-bar. Fig. 5 is a front elevation of the draw-bar, the coupling devices being removed. Fig. 6 is a vertical transverse section on line *x x* of Fig. 1. Fig. 7 is a longitudinal horizontal section of two draw-bars with the coupling devices in the position they assume when two cars are coupled on a curve. Fig. 8 is a like view showing the coupling devices in the position they assume when two cars are coupled on a straight line of track. Fig. 9 is a vertical longitudinal axial section of two couplers in the act of coupling, showing the coupling devices in their respective positions, the hook on the left being locked in position by the thrust-bar, while that on the right is swung out, the thrust-bar being held back by its locking-block. Fig. 9$^a$ is a like view showing the thrust bar of both couplers in their normal position. Figs. 10 and 11 are top and bottom plan views, respectively, of the coupling-hook. Figs. 12 and 13 are opposite side elevations of the same. Fig. 14 is a detached isometric view of the coupling-hook. Fig. 15 is an isometric view of the gravital thrust-bar. Fig. 16 is an under side view thereof. Fig. 17 is an isometric view of the gravital locking-block, and Fig. 17$^a$ is an under side view thereof.

This invention relates to that class of car-couplers commonly known as "twin" or "hook" couplers. The draw-bar and what is termed the "draw-head" in this class of couplers are generally cast in one piece and practically solid, providing only for the necessary cavities or chambers for the reception of some of the coupling devices, thus producing a draw-bar which is very heavy, though not correspondingly strong, as it is very difficult to anneal such draw-bars uniformly, owing to the great difference in the thickness of the metal in the respective parts which constitute the draw-bar.

One of the objects of this invention is to so construct the draw-bar and its draw-head as not only to effect a very material saving in metal, but also to form the walls of the same of as nearly uniform thickness as is practicable, so that the draw-bar may be uniformly annealed and its strength and durability increased beyond that of the draw-bars of usual construction, notwithstanding the reduction in the bulk and weight of the metal.

The further object of this invention is to provide solid bearings for the operative parts of the coupler, and also to provide means whereby the coupling of two cars will be insured under any circumstances.

To these ends the invention consists in the peculiar construction of the draw-bar and its draw-head, substantially as hereinafter fully described.

The invention further consists in the construction of the thrust or locking bar, and in the combination thereof with the coupling-hook and gravital locking-block for the thrust-bar, substantially as hereinafter fully described.

The essential elements of this coupler are, with the exceptions hereinafter noted, the same as those described in Letters Patent granted to me October 21, 1884, No. 306,876, and the Reissued Letters Patent dated July 7, 1885, No. 10,623, and in an application for patent of even date with this, Serial No. 209,316, said parts consisting of a pivoted coupling-hook, C, a gravital thrust or locking bar, E, a gravital locking-block, D, and a lever or shaft for operating the thrust-bar in uncoupling, the said parts being arranged in the draw-bar and draw-head for co-operation substantially as described in said Letters Patent and application for Letters Patent, and as hereinafter more fully described.

The draw-bar A and its draw-head B are cast in one piece, the draw-bar being of substantially cylindrical form from its rear end to a point, $a^3$, near its junction with the head B, from which point $a^3$ it is preferably made square or substantially square in cross-section.

The draw-bar A is cast hollow, and has in its under side a longitudinal slot, A', that is divided by a cross-piece or bridge, $a^2$, and from the rear end of the slot, on opposite sides thereof, extend vertically-inclined ribs or bearing-surfaces $a'$, upon which the inclined rear face of the thrust-bar slides. At the forward end of the draw-bar is formed a downwardly and forwardly inclined bearing-surface, $a$, for the correspondingly-inclined surface on the thrust-bar. The incline $a$ projects sufficiently far into the draw-head B to bring the forward end of the thrust-bar, when at the limit of its forward movement on said incline, in a position to lock the shank of the hook, as hereinafter described.

As shown in Figs. 3 and 4, the inner face of the portion $b'$ of the cavity B', formed in the draw-head B, in which the shank of the hook swings, and against which the said shank bears when the coupling is effected, conforms substantially to the rear vertical face of the said shank—that is to say, it is slightly curvilinear or concave—and terminates at its rear end in a square face or vertical wall, $b$, against which bears a corresponding face, $c$, at the end of the shank of the coupling-hook. I thus provide a bearing for the end of the hook-shank that will effectually prevent endwise motion thereof, consequently will effectually prevent the bending or breaking of the pivot-bolt $c^\times$ of the hook C. The opposite side, $b^2$, of the cavity is also hollowed out, so as to form side walls for the draw-head of comparatively little but of substantially uniform thickness, as shown in Figs. 7 and 8.

At or near the point of junction of the draw-bar and draw-head is formed a hollow boss or projection, $B^2$, in which is arranged the gravital block D. In my Letters Patent hereinbefore referred to I have shown this cavity as open at top. I prefer, however, to close the same, as shown, to prevent access thereto of dust or dirt, the said block having a transverse slot, D', of greater vertical than horizontal diameter, through which passes the guide and retaining pin or bolt $D^2$, said block having a portion of its front face and a corresponding portion of one of its lateral faces beveled, as shown at $d$ and $d'$, respectively, the incline or bevel $d'$ being preferably formed on a greater angle than the corresponding incline or bevel, $d$, as more plainly shown in Fig. 15.

On one side the draw-head is provided with projecting lugs or ears $B^3$ $B^3$, that are perforated for the reception of the pivot pin or bolt $c^\times$ for the coupling-hook C, and on the inside of said lugs is formed a bearing, $b^3$, for a corresponding bearing or boss, $C^3$, formed on the opposite sides of the shank of the coupling-hook C. Inasmuch as the distance between the outer faces of the lugs or ears $B^3$ is considerably greater than the distance between the inner faces of the roof and floor or top and bottom walls, $b^4$ $b^5$, of the draw-head, and inasmuch as in the usual construction of the draw-head this portion thereof is cast solid, a roof and floor, respectively, of inordinate thickness are formed, thereby adding correspondingly to the weight of the said draw-head. This I obviate by constructing the mold for the draw-bar and draw-head so as to form the cavities $B^4$ $B^4$ and $B^5$ $B^5$, on the upper and under sides, respectively, of the jaws $B^6$ $B^7$ of said draw-head, thus forming the roof and floor thereof of walls of comparatively little but of uniform thickness, as more plainly shown in Figs. 1, 2, and 6, said roof and floor being of about the same thickness as the walls of the draw-bar proper.

The projection or bearing $b^3$ on the lugs or ears $B^3$ is partly curvilinear and partly rectilinear, as shown at $b^7$, Figs. 4 and 5, against which bears a corresponding rectilinear face, $c^7$, on the boss or bearing $C^3$, on opposite sides of the coupling-hook C, when the shank of the hook is fully withdrawn into the draw-head—that is to say, when the lateral or outer face of the shank C' of the coupling-hook C lies in contact with the inner face of the corresponding wall, $b'$, of the draw-head, when the bearing-surface $c$ on the end of said shank will also lie in contact with the vertical rear wall, $b$, of said draw-head, as shown in Fig. 8, and on the left in Fig. 7, thus forming a second abutment for the hook to protect the pivot pin or bolt against injury from end-thrusts of or on the coupling-hook.

As more plainly shown in Fig. 5, the lugs or ears $B^3$ project from the jaw $B^6$ of the draw-head, so as to leave a vertical shoulder, $b^8$, that with the squared front face $b^9$ of the jaw $B^7$ form abutments or bumper-faces, which, when two cars come together, abut against each other to protect the coupling-hook and pivot-pin against injury. By means of these bumper-faces $b^8$ $b^9$, the vertical rear wall, $b$, of the cavity B' in the draw-head, and the rectilinear bearing-face $b^7$ on the lugs or ears $B^3$ ample provisions are made for protecting the hook and its pivot pin or bolt, as well as the bearings for the latter, from being injured in coupling or otherwise, which adds materially to the durability of the coupler, and enables me at the same time to make it much lighter than is usually the case.

The coupling-hook C consists of the hook proper, $C^2$, which may be constructed as shown with the inclined bearing-surface E⁴, as I have claimed these in a separate application for patent, filed September 8, 1886, Serial No. 213,013.

Having now described my said invention, what I claim, and desire to secure by Letters Patent, is—

1. A draw-bar for automatic couplers, consisting of a draw-head, B, and the hollow draw-bar A, having longitudinal ribs or webs on its inner surface and a slot in its under side intersected by a cross-piece or bridge, a², bearing-lugs A², formed on opposite sides of the rear end of the slot, inclined bearing-surfaces or webs a' at said rear end of the slot, an inclined bearing-surface, a, forming the rear wall of a transverse slot in the under side of the draw-bar and between it and the draw-head, the hollow boss or projection B², the curvilinear jaws B⁶ B⁷, bearing-lugs B³, projecting from one of said jaws, a recess or cavity, B', formed between the jaws, abutments b⁷ b⁸ b⁹, and the cavities B⁴ B⁴ and B⁵ B⁵, substantially as and for the purpose specified.

2. In a coupler of the class described, the combination, with the draw-head B, provided with a hollow boss, B², projecting from the upper face thereof, said boss being closed at top, and a pin extending transversely through the boss, of the gravital block D, hung from said pin within the boss, substantially as and for the purpose specified.

3. In a coupler of the class described, the combination of the draw-bar having a longitudinal slot in its under side intersected by a cross-piece or bridge, a², with the thrust-bar E, having in its under side a recess, e², substantially as described, for the purpose specified.

4. In a coupler of the class described, the combination, with the coupling-hook arranged to oscillate or swing on a vertical pivot and a thrust or locking bar having its forward end facing the shank of the hook beveled or provided with an inclined bearing-surface, said thrust-bar having a motion across the plane of rotation of said hook-shank, of a locking-block for the thrust bar having a vertical motion, substantially as and for the purpose specified.

5. The herein-described coupling-hook, having a slot, e⁴, in its shank, substantially as and for the purpose specified.

6. The herein-described coupling-hook, having the perforated and longitudinally-recessed hook portion C² and a shank, C', slotted longitudinally and terminating in a square vertical face, c, substantially as and for the purpose specified.

7. The herein-described coupling-hook, having the perforated and longitudinally-recessed hook portion C² and a shank, C', nearly rectilinear throughout its length and terminating in an attenuated square vertical face, c, said hook having a cavity, c³, in its front face extending along a portion of the shank and a longitudinal vertical slot, e⁴, in the said shank, substantially as and for the purpose specified.

In testimony whereof I affix my signature in presence of two witnesses.

WILLIAM H. THURMOND.

Witnesses:
W. D. GIBSON,
S. B. HEAD.